United States Patent [19]

Vincent et al.

[11] 4,040,796
[45] Aug. 9, 1977

[54] FAST LIGHTING ARTIFICIAL FIRELOG

[75] Inventors: George C. Vincent, Hayward; David Rauch, Castro Valley, both of Calif.

[73] Assignee: The Kingsford Company, Louisville, Ky.

[21] Appl. No.: 591,886

[22] Filed: June 30, 1975

[51] Int. Cl.$^2$ .................... C10L 5/36; C10L 11/00
[52] U.S. Cl. .......................... 44/14; 44/10 R; 44/38; 44/40; 44/41
[58] Field of Search ............. 44/14, 38, 40, 41, 10 R, 44/34

[56] References Cited

U.S. PATENT DOCUMENTS

| 225,244 | 3/1880 | Swift | 44/14 |
|---|---|---|---|
| 1,050,535 | 1/1913 | Hartung | 44/14 X |
| 2,789,890 | 4/1957 | Stevens | 44/41 |
| 3,637,355 | 1/1972 | Brockbank | 44/41 X |
| 3,726,651 | 4/1973 | Ronden | 44/14 |

Primary Examiner—Carl F. Dees
Attorney, Agent, or Firm—LeBlanc & Shur

[57] ABSTRACT

Disclosed is an artificial firelog comprised of a flammable body typically formed of a particulate wood and wax mixture preferably with salts added for flame color. In a preferred embodiment, by a coextrusion process, a groove is formed along the outer surface of the body and extends substantially its entire length. The groove is filled with gelled starter fuel. The log is preferably formed with at least one substantially flattened side with the gelled fuel filled groove located just above the flattened side whereby the log can be situated with its flattened side on the fireplace grate or andirons and the gelled fuel filled groove located along the lower preferably front, face of the log thereby facilitating the log's fast lighting characteristics. The log is provided with an over-wrapper having an inner low or medium density polyethylene coating and which over-wrapper is heat sealed about the log. When lighting, the over-wrapper is initially lit and this also ignites the gelled fuel. The heat and pressure from the hot expanding combustion gases then softens and ruptures the over-wrapper and allows the flame to spread along the gelled fuel in the notch thereby fully enveloping the firelog in flame.

20 Claims, 13 Drawing Figures

FAST LIGHTING ARTIFICIAL FIRELOG

The present invention relates to artificial fireplace logs and particularly to an artificial fast lighting firelog and method for forming the same.

Various types of fireplace starting materials have been proposed and manufactured in the past for starting natural wooden logs and/or artificial firelogs. For example, fires for fireplaces using natural wooden logs are commonly started by first igniting newspapers which, in turn, ignite kindling material and which, in turn, ignites the fireplace logs. Artificial firelogs are commonly started by first igniting newspapers which, in turn, ignite the artificial log. Obviously these procedures are somewhat cumbersome and require quantities of specific types of starting material. Other starting materials have included wicks permeated with fire starting fluid or solid fuel pellets set below the logs. Obviously significant amounts of time and effort are necessary using such known and other commonplace starting materials for igniting logs in a fireplace and use of such materials, ancillary to the logs per se, is generally inconvenient.

The present invention provides an artificial fast lighting firelog which minimizes or eliminates the foregoing and other problems associated with starting or igniting firelogs and provides a novel and improved artificial fast lighting firelog having various advantages in manufacture and use in comparison with prior artificial firelogs. The present invention also relates to a novel and improved method of manufacturing an artificial fast lighting firelog. Particularly, the present artificial firelog is formed by extruding a mixture of wax and sawdust or other particulate wood and cutting the extruded product to appropriate lengths for fireplace usage. To provide for fast lighting and without starter materials external to the log per se, a notch is formed along the external surface of the firelog as it is extruded and a gelled starter fuel is pumped into the notch during the extrusion process. The artificial log, when cut to appropriate length, thus includes a notch extending between the opposite ends and in which notch a gelled starter fuel is disposed. The artificial firelog is then preferably loosely packaged in an oil resistant over-wrapper which prevents staining from the gelled fuel and wax material of the log. Preferably, the over-wrapper has a circumference which exceeds the circumference of the log by about one inch and also has an inner low or medium density polyethylene coating whereby the over-wrapper also facilitates fast lighting of the firelog.

In a preferred form of artificial firelog constructed in accordance with the present invention, the firelog has at least one side which is generally flattened. The notch is formed along an external surface of the firelog just above, i.e. about one-half to one inch, the flattened side of the firelog. Consequently, when the log is disposed on the fireplace grate or andirons with its flattened side on the grate or andirons, the gelled fuel filled notch is located in optimum position along the lower front of the log for fast lighting.

To utilize the artificial fast lighting firelog of the present invention the only starting material extrinsic to the firelog and over-wrapper per se is a match. The match flame may be applied to the over-wrapper and the heat and pressure of the expanding combustion gases will rupture the over-wrapper enabling ignition of the gelled starter fuel in the notch of the firelog. As noted previously, the gelled fuel filled notch is located along the lower front side of the log and this location facilitates quick ignition of the log and full envelopment thereof in flame.

A further feature of the present invention resides in the method of manufacturing the artificial fast lighting firelog hereof. Particularly, the wood/wax mixture is coextruded with the gelled starter fuel. That is, the gelled starter fuel is supplied through a notch and fitting in the extrusion barrel during extrusion of the wood/firelog mixture. Consequently, the manufacture of the artificial fast lighting firelog hereof is readily adapted to conventional extrusion techniques and the manufacturing costs are consequently minimized and comparable to firelogs formed by known extrusion processes.

Accordingly, it is a primary object of the present invention to provide a novel and improved artificial fast lighting firelog and method of manufacturing the same.

It is another object of the present invention to provide a novel and improved artificial fast lighting firelog having fire starting materials which form an integral part of the firelog rendering unnecessary, with the exception of a match, starter materials external to the firelog per se.

It is still another object of the present invention to provide a novel and improved artificial fast lighting firelog and a method of manufacture therefor wherein the firelog is ignited and substantially totally enveloped with flame in a very short period of time after ignition of both ends, on the order of about 3 minutes.

It is still another object of the present invention to provide a novel and improved fast lighting artificial firelog having a predetermined shape, i.e. with at least one generally flattened side, for locating the long on a fireplace grate or andirons with fire starting materials integral with the log optimally located to facilitate quick ignition of the log.

It is a further object of the present invention to provide a novel and improved fast lighting aritificial firelog wherein the packaging material for the firelog serves the dual purpose of preventing staining from the wax and gelled fuel materials forming the firelog and facilitating ignition of the starter fuel forming part of the firelog.

It is a still further object of the present invention to provide a novel and improved method of manufacturing a fast lighting artificial firelog wherein the flammable material forming the body of the firelog and the gelled fuel forming the starter material for the firelog are coextruded.

It is a still further object of the present invention to provide a novel and improved fast lighting aritficial firelog and method of manufacturing the same wherein both the log and its manufacture are relatively inexpensive and comparable in expense to existing extruded firelogs and their cost of manufacture.

These and further object and advantages of the present invention will become more apparent upon reference to the following specification, appended claims and drawings wherein:

Figure 1:
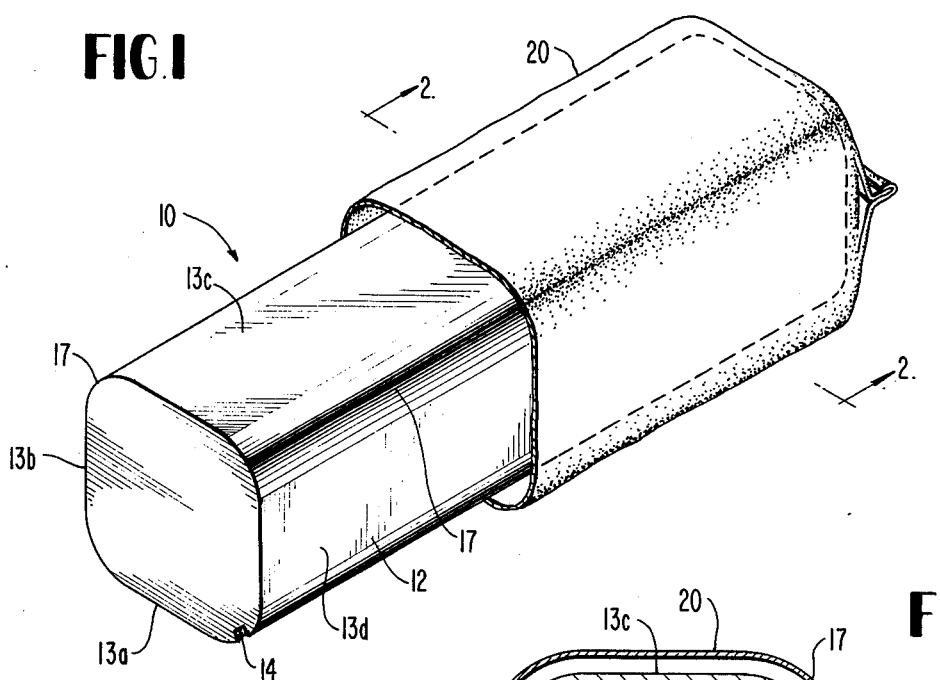
FIG. 1 is a perspective view of a fast lighting artificial firelog constructed in accordance with the present invention with parts of the over-wrapper broken away for ease of illustation.

Referring now to the drawings, particularly to FIG. 1, there is illustrated a fast lighting artificial firelog, constructed in accordance with the present invention and generally designated 10, in the form of an elongated body 12 composed of a mixture of wax and particulate woody material. More particularly, the particulate woody material may comprise sawdust, ground bark, hulls such as peanut shells or the like having dimensions of about ⅛ to ¼ inch but preferably reduced to a particle size that can pass through a ⅛ or smaller screen. The wax serves as a binder and may for example comprise a slack wax constituting a mixture of paraffin and microcrystalline waxes. Also, log 10 may include small amounts of salts, such as copper or strontium salts, to provide a colored flame. It will be appreciated, however, that the composition of the fireplace log body 12 does not per se form a part of the present invention and that any of the well known compositions utilized in the manufacture of artificial fireplace logs may be utilized in forming a fast lighting fireplace log in accordance with the present invention.

Figure 2:
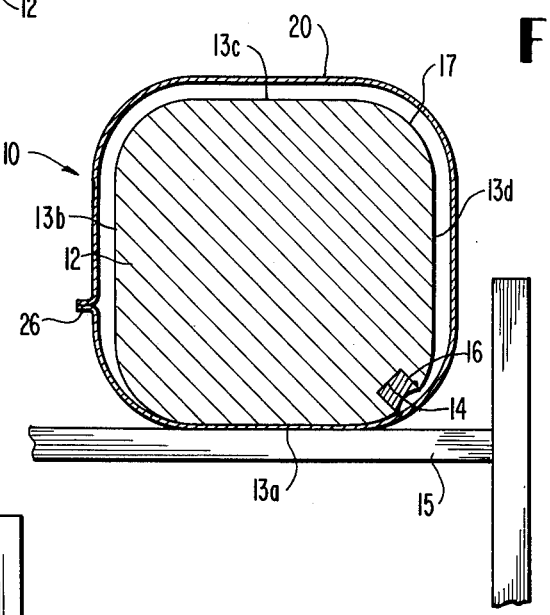
FIG. 2 is an enlarged cross-sectional view thereof taken generally about on line 2—2 in FIG. 1 and illustrating the firelog on an andiron.

As best illustrated in FIGS. 1 and 2, the generally elongated artificial fireplace log body 12 has at least one generally flattened side 13a adapted to rest on the grate or andirons 15 (FIG. 2) of a fireplace whereby the log 10 can be oriented in predetermined position about its long axis. As illustrated, the log is generally polygonal in cross section, preferably with four generally flattened sides 13a, 13b, 13c and 13d with a rounded corner or edge 17 between each adjacent pair of flattened sides. Located adjacent the one flattened side 13a, there is provided a notch 14 formed along the outer surface of the log and which notch extends generally longitudinally parallel to the long axis of the firelog body 12 and between its opposite ends. Notch 14 is preferably located at an elevation about one half to one inch above the flattened side 13a of the log to optimize the ignition characteristics of the log as set forth more particularly hereinafter. A starter fuel 16 is disposed within notch 14 and extends continuously the entire length of notch 14. As illustrated, the starter fuel 16 lies wholly within notch 14 and therefore within the perimeter of body 12. The fuel 16 may substantially fill the notch but is preferably inset from the perimeter of the notch 14. This spaces the starter fuel from the package or over-wrapper 20 described hereinafter which is loosely disposed about firelog 10 and, in conjunction with the loose over-wrapper, provides an air cavity along the length of the log and hence sufficient air to ensure the flame sufficient oxygen when the starter fuel is ignited in the manner described hereinafter.

Starter fuel 16 is preferably a gelled fuel which is balanced to act as a fuse with a low vapor pressure for adequate storage life. That is, the fuel should have a sufficiently low volatility to ensure adequate shelf life and a sufficiently high volatility to obtain desired ignition characteristics, a flashpoint on the order of 200° F. being preferred.

Figure 3:
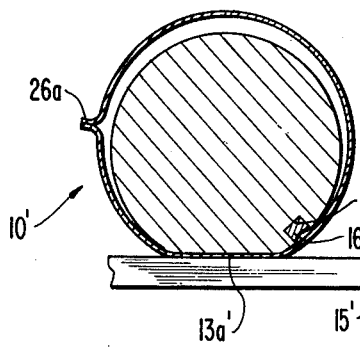
FIG. 3 is a view similar to FIG. 2 on a reduced scale illustrating a further form of firelog constructed in accordance with the present invention.

Artificial log 10 is preferably packaged within an over-wrapper 20 having an oil resistant barrier which, while not essential to the fast light characteristics of the present invention, is preferable to check staining from the fuel and wax material of the firelog. The over-wrapper may, for example, comprise kraft paper with an inner polyethylene coating 24 whereby the wrapper can be sealed along its seam 26 by heat sealing techniques. For example, as illustrated in FIG. 3, the wrapper is heat sealed along seam 26 whereby log 10 is fully encompassed within wrapper 20. Preferably, the over-wrapper is loosely disposed about the firelog. That is, the circumference of the over-wrapper should be somewhat greater, i.e. about one inch greater, than the circumference of the firelog and this assures an adequate supply of oxygen to the gelled fuel starter material during lighting. The seam 26 may be located, during packaging, to overlie the gelled starter fuel filled notch 14 to further assist its fast start lighting characteristics, as explained more particularly hereinafter with reference to FIG. 5, although such alignment with the fuel filled groove is not essential.

In a preferred form of the present invention, notch 14 is preferably approximately ⅜ inch deep and ⅜ inch in width and extends the full length of the log from end to end generally parallel to the long axis of the elongated log body 12. However, the notch can be otherwise dimensioned in width and/or depth as necessary and desirable. As noted previously, the volatility of the gelled starter fuel is preferably a compromise between low and high volatility to insure adequate storage life and desired ingition characteristics respectively. A fuel suitable for this purpose and preferable for use with the firelog of the present invention is a gelled fuel manufactured by Chevron Research, 576 Standard Ave., Richmond, Calf., and designated as Product No. K-17. This fuel is a deodorized hydrocarbon solvent which is thickened with a small fraction of gelling agent. Other suitable types of fuels, for example a solid pelletized type fuel, could be used and embedded in the notch. It will be appreciated that fast light characteristics of the present firelog are achieved to a significant extent by forming the notch for the gelled fuel lengthwise along the firelog body 12 between its opposite ends generally parallel to the axis of the log, and at at location closely adjacent the flattened side 13a of the log, i.e. that side of the log designed to engage the fireplace grate or andirons. However, it is within the scope of the present invention to utilize other gelled starter fuel filled notch configurations and locations thereof, for example one or more helical notches extending along the outer surface of the log, or one or more longitudinally spaced circumferentially extending notches or a plurality of discrete notches disposed at longitudinally and/or circumferentially spaced position about the log. Similarly, while a notch is preferable and serves as a means for retaining the gelled starter fuel on the log wholly within the confines of such log, which further facilitates packaging and handling, it is within the scope of the present invention to form a bead of starter fuel along the outer surface of the log.

In FIG. 3, there is illustrated a further form of the present invention identical to the form illustrated in FIGS. 1-2 except that the firelog is generally cylindrical in cross section with a flat 13a' formed longitudinally along an outer surface thereof. Preferably, the flat 13a' runs continuously between the opposite ends of the generally cylindrical log and in a direction paralleling its central axis. As in the preceding embodiment, the firelog 10' is provided with a notch 14' which extends continuously between opposite ends of log 10' at a location directly adjacent flat 13a'. Thus, the flat 13a' orients and locates the firelog on a grate or andirons 15' in such a manner that the fuel filled notch lies along the forward lower side of the log thereby facilitating quick envelopment of the log in flame when lit as discussed hereinafter.

To utilize the fast lighting artificial log of the present invention and with reference particularly to FIGS. 1-4, the log, with the over-wrapper enclosing the same, is disposed in the fireplace with a flattened side, i.e. side 13a or side 13a' directly on top of the fireplace grate or andirons and with the fuel filled notch preferably disposed to the front of the fireplace and along the lower part of the firelog.

While the form illustrated in FIG. 3 is thus readily oriented with the fuel filled notch along a lower side of the log, to facilitate such orientation with respect to the firelog illustrated in FIGS. 1-2, and also in FIG. 3, if desirable, suitable indicia can be provided on the over-wrapper to indicate the location of the groove. While the over-wrapper and firelog do not generally shift their relative circumferential positions, suitable means such as one or more spots of glue can be applied between the over-wrapper and fire-log during packaging to maintain them nonrotatable relative to one another thereby maintaining the indicia on the over-wrapper in alignment with the groove.

Figure 4:
FIG. 4 is a side elevational view of the firelog and wrapper with match applied thereto.

After being set on the fireplace andiron or grate as aforedescribed, a match is applied to the over-wrapper, preferably at both ends thereof adjacent the lower front side of the log as illustrated in FIG. 4, and the heat and pressure of the hot expanding combustion gases of the overwrapper and allow the flame to ignite the starter fuel in the notch. The flame then spreads rapidly along the notch, the loose spacing of the over-wrapper about the log ensuring adequate oxygen to the flaming gelled fuel even before the over-wrapper is completely burned. The intense heat generated by the flaming fuel along the length of the log, particularly along the lower front side of the log, and with assist from the flammable over-wrapper, serves to ignite the log and fully envelop the log in flame within a short period of time, for example on the order of about 3 minutes. It will be appreciated that the over-wrapper 20 is not essential to the fast light characteristics of the present invention and the firelog 10 can be ignited simply by applying a match flame directly to the gelled starter fuel in the notch.

Figure 5:
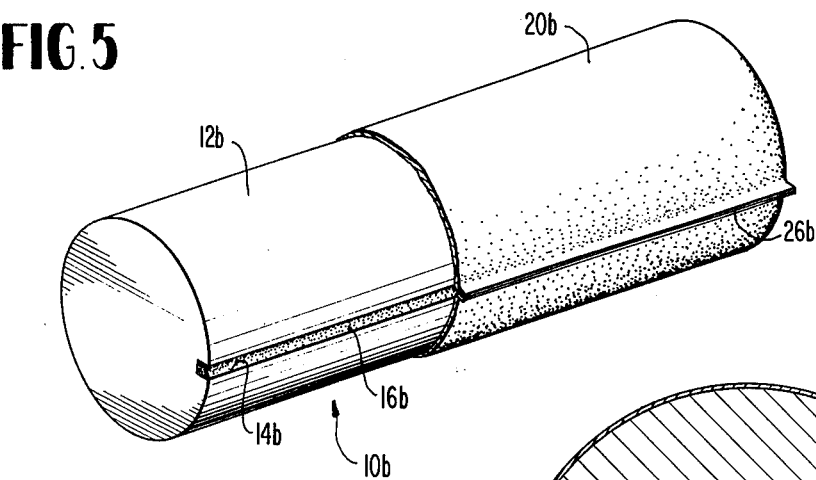
FIG. 5 is a perspective view of a still another form of fast lighting artificial firelog constructed in accordance with the present invention.
Figure 7:
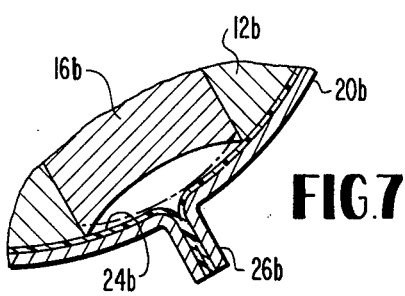
FIG. 7 is an enlarged fragmentary cross-sectional view illustrating the gelled starter fuel in the notch of the firelog and the seam of the over-wrapper overlying the notch and fuel.
Figure 8A:
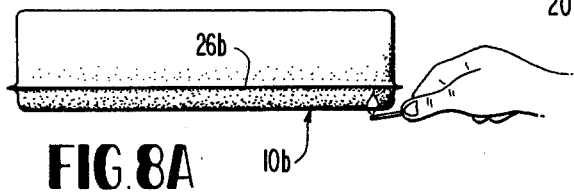
FIGS. 8A-8E are schematic illustrations of the manner in which the firelog of FIG. 5 is ignited with rapid envelopment of the firelog by the flame.
Figure 8B:
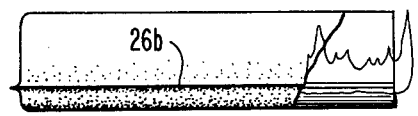
Figure 8C:
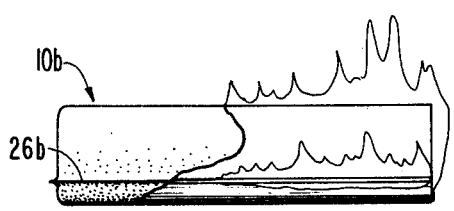
Figure 8D:
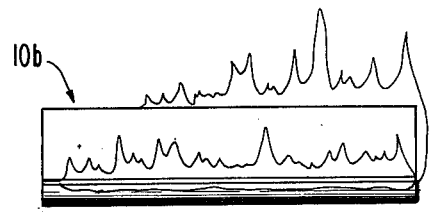
Figure 8E:
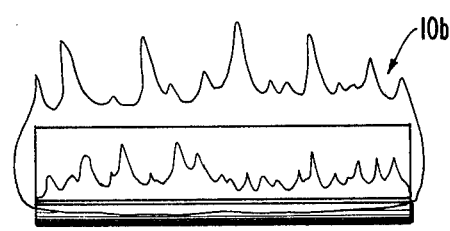

Referring now to the form hereof illustrated in FIG. 5, there is shown a firelog generally designated 10b in the form of an elongated cylindrical body 12b composed of material similar to the material forming the body 12 of the embodiment of FIGS. 1-2. It will be appreciated, however, that in this form the body is cylindrical without one or more flattened sides. The firelog body 12b, similarly as in both prior forms of the present invention, is provided with a longitudinally extending notch 14b formed along its outer surface and which notch extends generally longitudinally parallel to the long axis of the cylindrical firelog body 12b. Also, a starter fuel 16b is disposed within notch 14b and extends substantially coextensively therewith. An over-wrapper 20b, similar to the wrapper 20 of the embodiment hereof illustrated in FIGS. 1-2, is provided and may be heat sealed along a seam 26b whereby the log 10b is fully encompassed within wrapper 20b. In this form, the over-wrapper tightly engages about the log and preferably the seam 26b is located, during packaging, to overlie the gelled starter fuel filled notch 16b. As illustrated in FIG. 7, the over-wrapper may be comprised of an outer covering composed of kraft paper with an inner polyethylene coating 24b. The outer surface of the gelled fuel 14b is spaced back from the cylindrical confines of the firelog body 12b to provide an air filled space between the over-wrapper 20b and the outer surface of the gelled fuel 16b.

Figure 6:
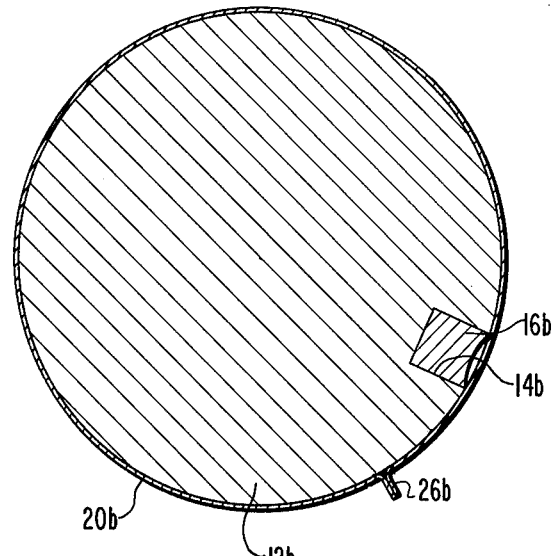
FIG. 6 is a cross sectional view of a form of firelog with the over-wrapper seam misaligned with the fuel filled notch.

In FIG. 6, the wrapper 20b is illustrated in misalignment with the fuel filled notch 14b. Thus, the seam can be misaligned with the fuel filled notch without significantly detracting the fast lighting characteristics of the present log.

To utilize the fast lighting log hereof and with reference particularly to FIGS. 8A-8E, the log is disposed on andirons or a grate in a fireplace with the gelled fuel filled notch located along the lower front side of the fireplace. As in the prior embodiments, the overwrapper can be provided with indicia to indicate the location of the gelled fuel filled notch whereby an individual can properly orient the cylindrical log in the fireplace with the notch along the lower, preferably front, side of the log. A match is applied to an end of the seam 26b of the over-wrapper. When the over-wrapper seam is longitudinally aligned in overlying relation to the gelled starter fuel filled notch, the seam softens from the heat, and ruptures from the heat and pressure of the hot expanding combustion gases of the over-wrapper to allow flame to ignite the starter fuel in the notch. The flame then spreads rapidly along the notch, the spacing of the fuel from the over-wrapper as illustrated in FIG. 7 assisting to maintain sufficient oxygen for support of the flame as both the starter fuel and over-wrapper burn. The intense heat generated by the flaming fuel along the length of the log with assist from the flammable over-wrapper serves similarly as in the previous embodiments to ignite the log and fully envelope it in flame within a very short period of time.

Figure 9:
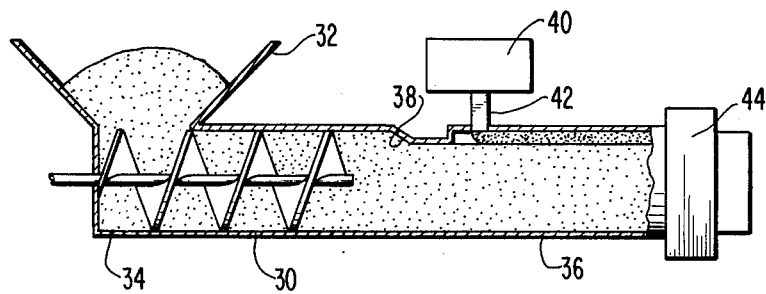
FIG. 9 is a schematic view illustrating the manner in which the wood/wax mixture and the gelled starter fuel are coextruded.

Referring now to FIG. 9, there is illustrated schematically a part of a typical manufacturing process. The constituent materials comprising the log are mixed in a mixer, not shown, and subsequently conveyed to an extruder 30. Particularly, the mixture is conveyed to a hopper 32 mounted at one end of a screw barrel 34 of extruder 30. The mixture is this driven along the extruder into a die barrel 36. Along one side of the die barrel 36 there is provided a die 38 in the shape of the groove to be formed in the log. Gelled started fuel is pumped for example by a pump 40 and fitting 42 in the barrel 36 into the notch formed by the die as the extruded log passes through the die barrel. A cut-off device schematically illustrated at 44 is utilized to cut the logs to the desired lengths. Thus, the logs with the gelled starter fuel are coextruded.

It will be obvious to those skilled in the art that any conventional extruding apparatus suitable to produce the log of this invention may be used, and this invention is not intended to be limited to the screw extruder shown. Furthermore, as noted above this invention is not intended to be limited to a particular log composition but may be adapted within the scope thereof to any artificial log formulation.

After the logs have been cut in desired lengths they are individually wrapped using well known techniques, preferably utilizing the wrapping material described herein although any conventional wrapping material may be utilized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An artificial fast lighting firelog consisting essentially of an elongated flammable body formed of particulate material and a binder, and means for fast lighting said body including means forming part of said body and defining a groove extending substantially between opposite ends of said elongated body, and a starter fuel disposed within and along said groove lying substantially coextensive therewith for igniting said body, and an over-wrapper for said firelog formed of flammable material, said over-wrapper comprising sheet material, and means carried by said over-wrapper forming an oil resistant barrier therethrough, said firelog adapted to be positioned whereby when said over-wrapper is ignited at an end thereof said fuel will ignite along the length of said groove to thereby rapidly ignite said over-wrapper along the length thereof and said firelog without removal of said over-wrapper.

2. A firelog according to claim 1 wherein said body is generally cylindrical in shape.

3. A firelog according to claim 1 wherein said groove extends substantially linearly between the opposite ends of said elongated body.

4. A firelog according to claim 1 wherein said body is formed of a mixture comprising wax and sawdust.

5. A firelog according to claim 1 wherein said body is generally cylindrical in shape and said groove extends substantially linearly between the opposite ends of said elongated body, said body being formed of a mixture comprised of wax and sawdust.

6. A firelog according to claim 1 wherein said body is elongated, and means carried by said firelog for orienting the same about its long axis relative to a support therefor and against substantial rotation about its long axis.

7. A firelog according to claim 6 wherein said groove is located along a surface in the lower half of the log when the log is oriented.

8. A firelog according to claim 7 wherein said orienting means includes a substantially flattened surface portion of said log which extends along the underside of the log when oriented on the support.

9. A firelog according to claim 8 wherein said groove and said flattened side extend substantially the entire length of said log and generally parallel to one another.

10. A firelog according to claim 9 wherein said groove is located substantially one half to one inch above the flattened side of said log.

11. A firelog according to claim 1 wherein said body and said over-wrapper for said body are generally cylindrical in shape with said groove extending substantially between the opposite ends of said body, said fuel in said groove lying substantially coextensively therewith, said over-wrapper having a seam substantially coextensive with and substantially overlying said groove and said fuel whereby ignition of said over-wrapper along said seam ignites said fuel substantially along the entire length of said groove.

12. A firelog according to claim 11 wherein said over-wrapper comprises sheet material, and means carried by said over-wrapper forming an oil resistant barrier on said sheet material.

13. A firelog according to claim 11 wherein said seam is comprised of edge portions of said over-wrapper overlying one another and projecting outwardly of said over-wrapper providing an easily ignitable fire starting over-wrapper flange.

14. A firelog according to claim 13 wherein said over-wrapper comprises sheet material, and means carried by said over-wrapper forming an oil barrier on said sheet material.

15. A firelog according to claim 14 wherein said body is formed of a mixture comprised of wax and sawdust.

16. A firelog according to claim 1 wherein said body and said over-wrapper for said body are elongated, said over-wrapper having a seam comprised of edge portions of said over-wrapper overlying one another and projecting outwardly of said over-wrapper providing an easily ignitable fire starting flange.

17. A firelog according to claim 16 wherein said body and said over-wrapper are generally cylindrical in shape with said groove and the fuel contained therein coextending substantially between the opposite ends of said cylindrical body.

18. A fire wrapper according to claim 1 wherein said fuel comprises a hydrocarbon solvent having a flashpoint within the range of 120°–450° F.

19. A firelog according to claim 18 wherein said fuel includes a gelling agent.

20. A method of manufacturing an artificial fast lighting firelog comprising:
passing a mixture of particulate material and a binder therefor through an extrusion barrel to form an elongated firelog, having a notch extending along the outer surface of the firelog parallel to the longitudinal axis thereof and a substantially flattened surface along one side of the log adjacent said notch; disposing a starter fuel in said notch while said mixture is passed along said extrusion barrel; cutting the elongated firelog to form discrete lengths thereof as it emerges from the extrusion barrel; providing an over-wrapper of sheet material carrying an oil resistant barrier thereon; wrapping said discrete lengths with said over-wrapper to form an artificial firelog with a wrapper which may be ignited by igniting said wrapper at an end thereof and thereby igniting the starter fuel in the notch.

* * * * *